United States Patent Office 3,065,665
Patented Nov. 27, 1962

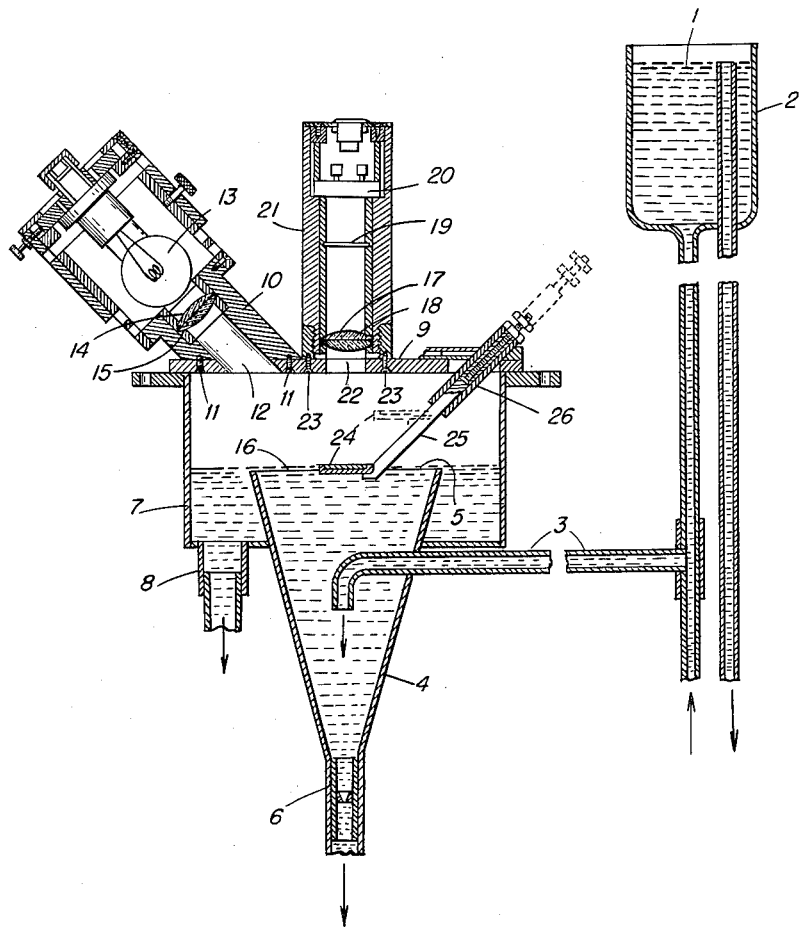
Inventors
Mohd Akhtar
Derek Bullas
By their attorneys

3,065,665
NEPHELOMETERS
Mohd Akhtar, Balsall Common, near Coventry, and Derek Bullas, Kenilworth, England, assignors to Courtaulds Limited, London, England, a British company
Filed Oct. 1, 1959, Ser. No. 843,672
Claims priority, application Great Britain Oct. 30, 1958
4 Claims. (Cl. 88—14)

This invention is concerned with nephelometers for measuring the clarity of liquids.

When a beam of light is directed at an acute angle onto the surface of an optically clear liquid there may be formed at the point of incidence a reflected beam and a refracted beam. When the liquid contains suspended particles diffuse reflection also occurs. Nephelometers are used to measure the intensity of the diffuse reflections of heterogeneous systems, and, as this intensity is proportional to the total surface area and the colour of the suspended particles, calibrated nephelometer readings are a quantitative measure of the turbidity of the liquid under test.

It is frequently necessary to monitor the clarity of a liquid supply. Thus domestic and industrial supplies of water which are subject to fluctuating degrees of contamination are subjected to routine turbidity measurements. Known types of turbidity meters which measure the light transmitted by liquid samples have light sources and in some cases photo-electric cells below the level of the liquid so that the light must pass through transparent windows, or the transparent walls of the vessel containing the liquid. Such windows and walls in contact with a turbid liquid become obscured by deposited sediment and require frequent cleaning for accurate monitoring of the liquid.

The object of this invention is to provide a nephelometer for measuring the concentration of particles suspended in a continuously changing liquid sample, the light source and photocell of the nephelometer being above the level of the liquid.

According to the present invention a nephelometer for measuring the concentration of particles suspended in a continuously flowing liquid comprises a vessel, means to continuously feed liquid into and through the vessel whilst maintaining a substantially constant level of liquid therein, a light source capable of directing a beam of light onto the level attainable by the liquid supplied to the vessel and a photoelectric cell above the level and arranged to receive only light diffusely reflected by the particles dispersed within the liquid.

The level of the liquid sample may be maintained constant by allowing liquid to flow over the rim of the vessel. The overflow may be controlled by a constant head device to feed the liqid to the vessel at a constant rate equal to the desired rate of overflow, or, where the vessel has an auxiliary outlet, the rate of feed of the liquid is equal to the combined rates of flow of the liquid eliminated by the auxiliary outlet and the liquid overflowing from the vessel. A desirable rate of overflow maintains a substantially smooth and ripple-free surface on the liquid in the vessel.

The vessel is preferably a funnel or open-ended, inverted cone with an outlet pipe extending from the apex having an inlet let into the walls of the vessel below the rim or open end. As the funnel has no stagnant spots there is substantially no accumulation of the sediment which may be present in a liquid under test.

The direction of the incident light beam and the disposition of the walls of the vessel should be such that no reflection from the walls is directed towards the photoelectric cell.

To eliminate extraneous light, the upper portion of the vessel may be enclosed in an opaque container having a drain pipe for the elimination of the overflow from the vessel and a coverplate in which are mounted the light source and photoelectric cell.

An embodiment of the invention is illustrated in the accompanying drawing which is a vertical section of the apparatus.

Referring to the drawing, water 1 is continuously pumped into a constant head device 2 which feeds the water 1 at a steady rate through an inlet pipe 3 into a conical vessel 4 from which the water escapes over a rim 5 and through an outlet pipe 6. The overflow falls into a container 7 from which it is discharged through a drain pipe 8. The container 7 has a cover-plate 9 to which a lamp-housing 10 is secured by screws 11 over a port 12. The lamp-housing 10 holds a twelve volt, forty-eight watt tungsten fiilament lamp 13 and lenses 14 and 15 which focus an image of the filament of the lamp 13 on the water surface 16. The light scattered upwards by the surface 16 is collected by lenses 17 and 18 and focussed onto a circular aperture 19 which controls the illuminated area of a barrier-layer photocell 20. The photocell 20 is mounted in a cell-housing 21 which is secured over a port 22 in the cover plate 9 by screws 23.

An electric current is produced in an electric circuit (not shown) which includes the photocell 20, the current being proportional to the intensity of light falling on the photocell 20. The current is fed to a magnetic amplifier (not shown) the output of which may be registered on a meter (not shown) or used to operate a recorder and alarm system (not shown).

The instrument is calibrated for a given species of suspended matter with a number of reference samples of water containing known concentrations of the suspended matter. The samples are continuously circulated through the instrument by returning the water discharged from the outlet pipe 6 and the drain pipe 8 to the constant head device 2. The concentration of the suspended matter in the first reference sample is the maximum concentration expected to be encountered in practice. The output current of the amplifier due to the diffuse reflection of the first sample is modified to obtain a full scale deflection of the recording needle of the meter. Thereafter, other samples of water containing known lower concentrations of suspended matter are circulated through the apparatus and further meter readings are taken. The results are plotted to form a calibration curve.

The instrument is then drained of water and a reference scattering screen 24 mounted on an arm 25 slidable in a sleeve 26 in the cover-plate 9, is depressed until the beam of light from the lamp 13 is focussed on its surface. The meter reading generated by the diffuse reflection from the reference scattering screen 24 then serves as a permanent reference point for the condition of the instrument which must remain constant, or be restored, for the calibration to be valid.

What we claim is:

1. In a nephelometer for measuring the concentration of particles in a continuously flowing liquid comprising a vessel, means to continuously feed liquid into and through the vessel whilst maintaining a substantially constant level of liquid therein, a light source adapted to direct a beam of light onto the level attainable by the liquid supplied by the vessel and a photoelectric cell above the level and adapted to receive only light diffusely reflected by particles dispersed in the liquid, wherein the vessel is a funnel, an inlet let into the convergent wall of the funnel below the rim, the rim serving as a weir from which liquid may overflow from the funnel.

2. A nephelometer as claimed in claim 1 in which the means to continuously feed liquid into the vessel is a constant head liquid supply device.

3. A nephelometer as claimed in claim 1 having an opaque shroud to seal the interior of the vessel from extraneous light.

4. In a nephelometer for measuring the concentration of particles in a continuously flowing liquid comprising a funnel, an inlet pipe let into the convergent wall of the funnel below the rim, said rim serving as a weir from which liquid may overflow from the funnel, and a constant head liquid supply device connected to the inlet pipe, in combination with a closed opaque container enclosing the rim of the funnel, an outlet in the container for overflow from said funnel, a light source in the lid of the container to form a beam at an acute angle on the surface of the liquid in said funnel, a photoelectric cell on said lid and means for collecting and focusing the light diffusely reflected by particles in the liquid onto said photo cell.

References Cited in the file of this patent

UNITED STATES PATENTS

| | | |
|---|---|---|
| 2,122,824 | Pick | July 5, 1938 |
| 2,299,529 | Crampton | Oct. 20, 1942 |
| 2,455,966 | Ackley | Dec. 14, 1948 |
| 2,839,963 | Moss et al. | June 24, 1958 |
| 2,852,693 | Hughes et al. | Sept. 16, 1958 |

FOREIGN PATENTS

| | | |
|---|---|---|
| 463,391 | Canada | Feb. 20, 1950 |
| 696,675 | Great Britain | Sept. 9, 1953 |